(12) United States Patent
Weiss

(10) Patent No.: US 7,681,472 B2
(45) Date of Patent: Mar. 23, 2010

(54) BICYCLE SHIFTER

(75) Inventor: Martin Weiss, Schweinfurt (DE)

(73) Assignee: SRAM, LLC, Chicago, IL (US)

( * ) Notice: Subject to any disclaimer, the term of this patent is extended or adjusted under 35 U.S.C. 154(b) by 123 days.

(21) Appl. No.: 11/686,912

(22) Filed: Mar. 15, 2007

(65) Prior Publication Data

US 2007/0214908 A1  Sep. 20, 2007

(30) Foreign Application Priority Data

Mar. 15, 2006  (DE) .................. 10 2006 011 855

(51) Int. Cl.
*B62M 25/00* (2006.01)
*B62M 25/04* (2006.01)

(52) U.S. Cl. .................. 74/502.2; 74/473.14; 74/489; 74/527

(58) Field of Classification Search .......... 74/527, 74/473.14, 473.28, 489, 502.2
See application file for complete search history.

(56) References Cited

U.S. PATENT DOCUMENTS

| 5,524,501 | A | * | 6/1996 | Patterson et al. ......... 74/473.25 |
| 5,615,580 | A | * | 4/1997 | Chen et al. ............ 74/473.13 |
| 5,988,008 | A | | 11/1999 | Rau |
| 6,021,688 | A | * | 2/2000 | Chang ................ 74/502.2 |
| 6,067,875 | A | * | 5/2000 | Ritchey et al. .......... 74/502.2 |
| 6,145,407 | A | | 11/2000 | Rottmann |
| 6,209,413 | B1 | | 4/2001 | Chang |
| 6,389,920 | B1 | | 5/2002 | Chen |
| 6,604,440 | B2 | | 8/2003 | Wessel |
| 6,729,203 | B2 | * | 5/2004 | Wesling et al. ............ 74/502.2 |
| 2002/0000136 | A1 | * | 1/2002 | Feng et al. .............. 74/502.2 |
| 2003/0221506 | A1 | | 12/2003 | Wesling |
| 2004/0069089 | A1 | | 4/2004 | Chen |
| 2005/0126329 | A1 | | 6/2005 | Blaschke |

FOREIGN PATENT DOCUMENTS

| DE | 197 34 682 A1 | 2/1999 |
| DE | 1 00 43 612 A1 | 3/2002 |
| DE | 202 14 523 U1 | 12/2002 |
| DE | 103 58 438 A1 | 7/2005 |
| DE | 10 2005 014 007 A1 | 9/2006 |

* cited by examiner

*Primary Examiner*—Richard W L Ridley
*Assistant Examiner*—Thomas Diaz
(74) *Attorney, Agent, or Firm*—Milan Milosevic; Lisa Serdynski

(57) ABSTRACT

A shifter for a bicycle transmission that includes a spring element that functions as a preloaded spring for cable-release operations and a detent pawl. The shifter also includes a housing having a detent contour, a cable spool for winding and unwinding a control cable thereon, and an actuator. The actuator includes a release element, a spring seat and a driver. The spring element includes a detent pawl, a base and a spool driver. The detent pawl is engageable with the detent contour to maintain the shifter in a current detent position. The base is supported by the spring seat and the spool driver is operatively engages and rotates the spool.

14 Claims, 3 Drawing Sheets

BICYCLE SHIFTER

BACKGROUND OF THE INVENTION

The present invention relates to bicycle shifters, and more particularly, to a bicycle shifter including a spring element that functions as a preload spring for cable-release operations and a detent pawl.

Typically, a rider selects a desired bicycle gear by actuating a shifter that pulls or releases a tensioned control cable connected to a gear change device such as a derailleur or an internal gear hub. Once a gear is selected, the bicycle shifter maintains the current selected gear. Shifters of this type are disclosed in German patents DE 103 58 438 and DE 100 43 612 A1.

These shifters generally include an actuator, a cable spool and a retaining device for maintaining the selected gear. The actuator rotates the cable spool and the retaining device prevents the cable spool from unwinding under the force of the tensioned control cable.

DE 103 58 438 A1 discloses a twist-shifter that generally includes a housing, a cable spool and an actuator in the form of a rotatable grip. The shifter further includes a detent pawl and a discrete preloaded spring. The detent pawl is supported by the housing and engages separate locking and releasing contours. The preloaded spring is arranged between the actuator and the cable spool to assist the cable-release operation.

DE 100 43 612 A1 also discloses a shifter that generally includes a housing, a cable spool, and a rotatable grip. The shifter further includes a pawl and a preloaded spring. The pawl is disposed on the cable spool and engages a plurality of teeth in the shifter housing. The preloaded spring, shown integral with the spool, assists in the cable-release operation. Alternatively, the pawl, preloaded spring and the cable spool may be configured as a single piece.

These shifters generally function in the same manner. During a cable-pull operation, the actuator is rotated in a first direction to wind the control cable as the detent pawl ratchets over the detent contour. Once the desired gear is selected, the detent pawl engages one of the teeth of the contour to maintain the current gear position. During a cable-release operation, the actuator is rotated in a second direction, opposite the first, to unwind the control cable. Upon initial rotation of the actuator, the spring is preloaded. Upon further rotation, the detent pawl is released from a current detent position by a release element. As the detent pawl displaces toward the next detent position, the spool is rotated, or accelerated, by the preloaded spring to boost or assist the cable unwind operation in addition to the tensile loading of the control cable.

SUMMARY OF THE INVENTION

The object of the present invention is to provide a shifter that combines the detenting and the spring-assisted cable-release functions into a single spring component.

The present invention provides a bicycle shifter that includes a housing having a detent contour, a cable spool, an actuator and a spring element. The cable spool winds and unwinds a control cable connected to a gear-change device. The spring element includes a detent pawl, a base and a spool driver. The detent pawl releasably engages the detent contour to maintain the shifter in a current detent position. The base is supported by the spring seat of the actuator. The spool driver operatively engages and rotates the spool. The shifter is configured such that the spring element is preloaded during the onset of a cable-release operation before the detent pawl is released from the current detent position. The spring element may be contoured, shaped and supported to exhibit the desired preload characteristics.

The actuator includes a release element, a spring seat and a driver. The actuator is displaceable to perform a cable-pull and cable-release operations. The shifter is configured such that during a cable-release operation the actuator is initially displaced from a rest position to preload and reversibly deform the spring element without releasing the detent pawl from the current detent position. Upon further displacement of the actuator, the release element engages the spring element to release the detent pawl from the current detent position. The released preloaded spring element then rotates, or accelerates, the cable spool to unwind the control cable until the detent pawl engages a next detent position.

In one embodiment of the present invention, the spring element is a single piece shaped from a flat strip of metal. The driver is received in a mating slot of the cable spool to transmit the displacement the actuator to the cable spool. The release element and the driver are disposed on a face of the actuator. The spring element is configured such that when installed in the shifter there is no play between the spool, actuator and detent contour in the shifter rest position. The cable spool includes a first bumper to support the spring element upon installation of the spring into the cable spool. Further, the cable spool includes a second bumper to support the spring element under deformation.

The present invention provides a shifter that has a simple and compact design. The spring element allows for a release path and/or course for the release forces that is individual to each gear by having different structures of the spring element and having different support points or bumpers on the inner diameter of the housing or on the circumference of the cable spool. The arrangement of the spring element between the cable spool and the housing allows for a very compact design of the shifter that is suitable for both lever shifters and twist-shifters.

These and other features and advantages of the present invention will be more fully understood from the following description of one or more embodiments of the invention, taken together with the accompanying drawings.

DETAILED DESCRIPTION

Figure 1:
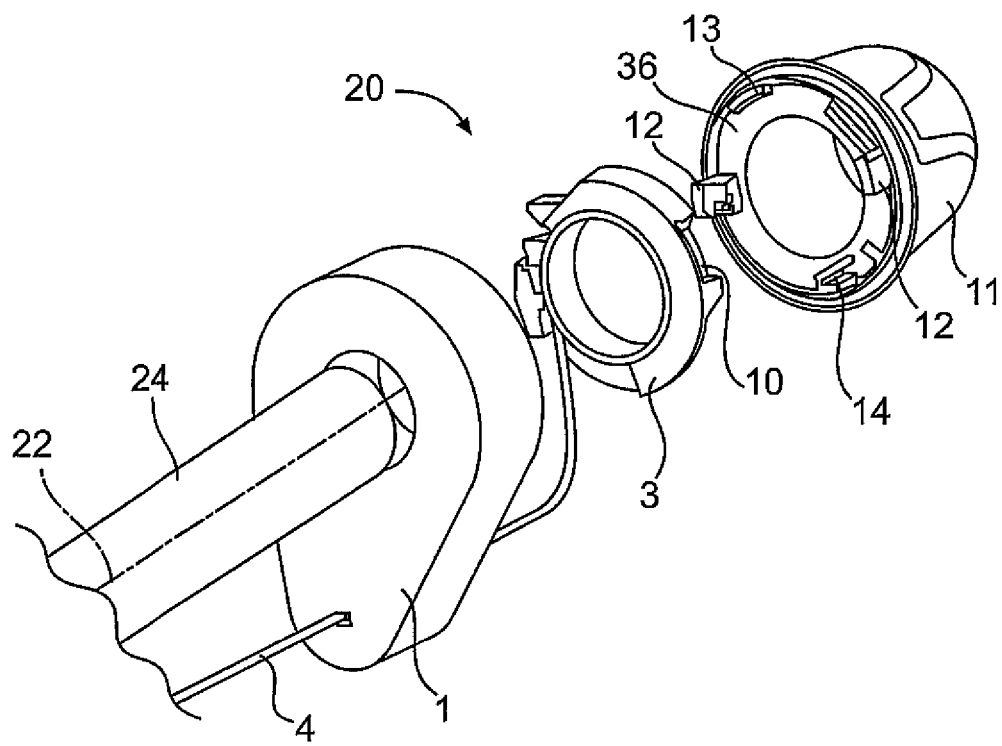
FIG. 1 is an exploded front perspective view of a bicycle shifter in according to one embodiment of the present invention.
Figure 2:
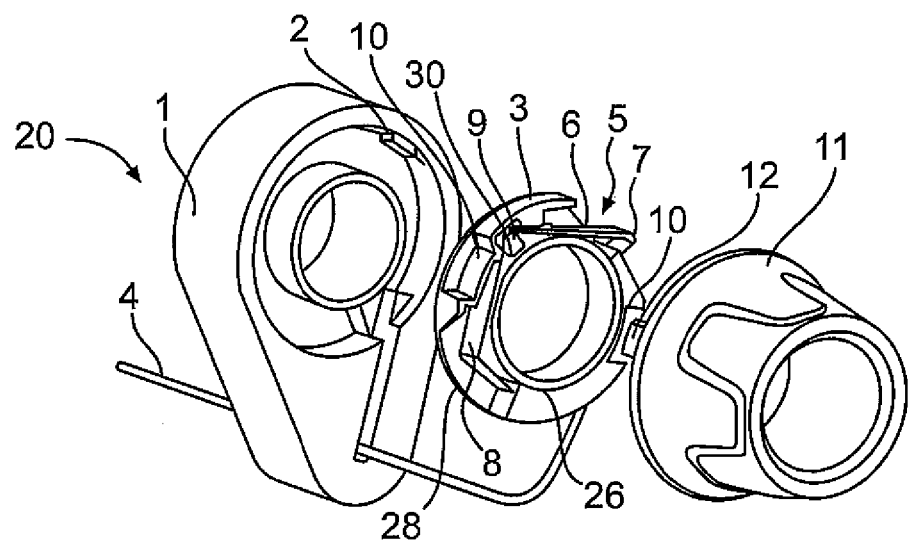
FIG. 2 is an exploded rear perspective view of the bicycle shifter of FIG. 1.

FIGS. 1-4 illustrate a bicycle shifter 20 according to one embodiment of the present invention. Looking to FIGS. 1-3, the bicycle shifter 20 includes a housing 1 having a detent contour 2, a cable spool 3, a spring element 5 and an actuator 11. The cable spool 3 is enclosed by the housing 1 and receives one end of a control cable 4 connected to a gear change device (not shown). The gear change device may a derailleur, an internal gear hub or the like. The cable spool 3 and the actuator 11, in this embodiment a rotatable handgrip, are rotatable about a central axis 22 of a handlebar 24. The actuator 11 is rotatable in a cable-pull direction to wind the control cable 4 about the cable spool 3 and is rotatable in a cable-release direction opposite the cable-pull direction to unwind the control cable 4.

The spring element 5 is disposed between an inner circumference 26 of the spool 3 adjacent the handlebar 24 and an outer circumference 28 of the spool 3. The spring element 5 includes a detent pawl 6, a base 8 and a spool driver 30 therebetween. The spring element 5 is supported by a first bumper 15 on the inner circumference 26 of the spool 3 to increase the flexural stiffness of the detent pawl 6. The spring element 5 is also supported by a second bumper 9 extending from the inner circumference 26 of the cable spool 3. The detent pawl 6 includes a detent nose 7 that is biased to engage the detent contour 2 of the housing 1 to maintain the shifter in a current detent position. To accommodate the length of the base 8 in the spool 3, the base 8 is angled toward the inner circumference 26 of the cable spool 3. Further, the inner circumference 26 has a flat portion 34 where the inner circumference 26 could be tangent to the base 8. The deformation of the spring element 5 is determined by the bumpers on the inner and outer circumferences of the spool.

The actuator 11 includes two drivers 12 on a face 36 of the actuator 11 that are received in two mating slots 10 on the outer circumference 28 of the cable spool 3 to transmit the displacement of the actuator 11 to the spool 3. Alternatively, the drivers 12 may be located on the spool 3 and the actuator 11 includes the mating slots 10. The actuator 11 further includes a release element 13 and a spring seat 14 on the face 36 of the actuator 11. The release element 14 is engageable with the detent pawl 6 to release the pawl nose 7 from the detent contour 2. The base 8 is supported by the spring seat 14 with approximately zero clearance. The spring seat 14 allows the shifting force and/or the initial preload to be introduced into the spring element 5 in a predictable manner. The spring element 5 is installed with a low degree of initial preload between the projection 9 and the spring seat 14.

Figure 3:
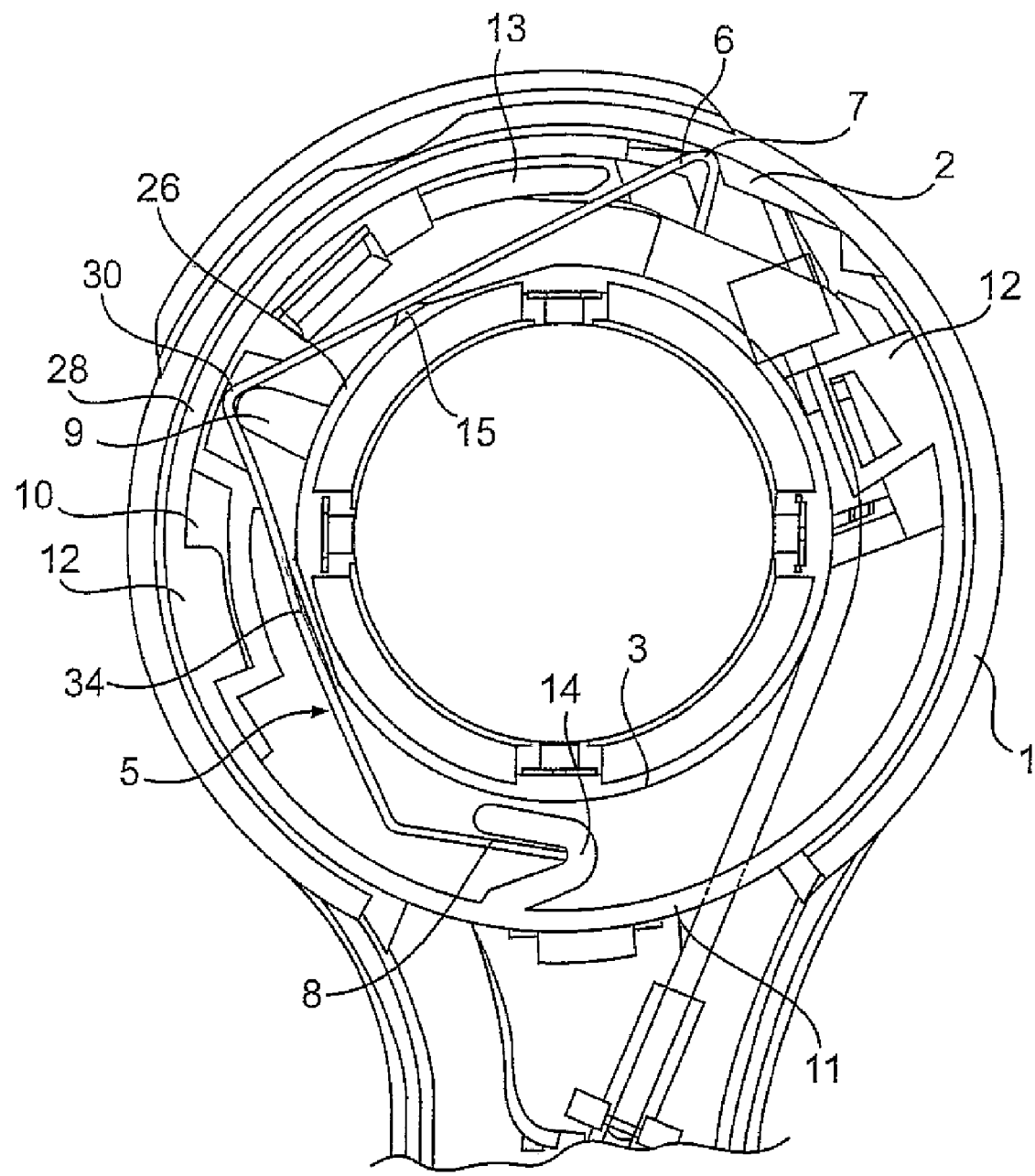
FIG. 3 is a cross-sectional view of the bicycle shifter of FIG. 1 showing a spring element in a unloaded state.

Looking to FIG. 3, the shifter 20 is shown in a rest position with the spring element 5 in an unloaded state. When the actuator 11 is rotated in the cable-pull direction, the cable spool 3 is rotated in the same direction by the drivers 12 that are engaged in the mating slots 10 of the cable spool 3. The pawl nose 7 ratchets over the detent contour 2 until a next detent position. The rider is notified of the next detent position by noise made by the pawl nose 7 engaging the detent contour 2. The actuator 11 may be further rotated until the desired gear position is reached. Accordingly, the rider may shift several gears with one shift motion.

Figure 4:
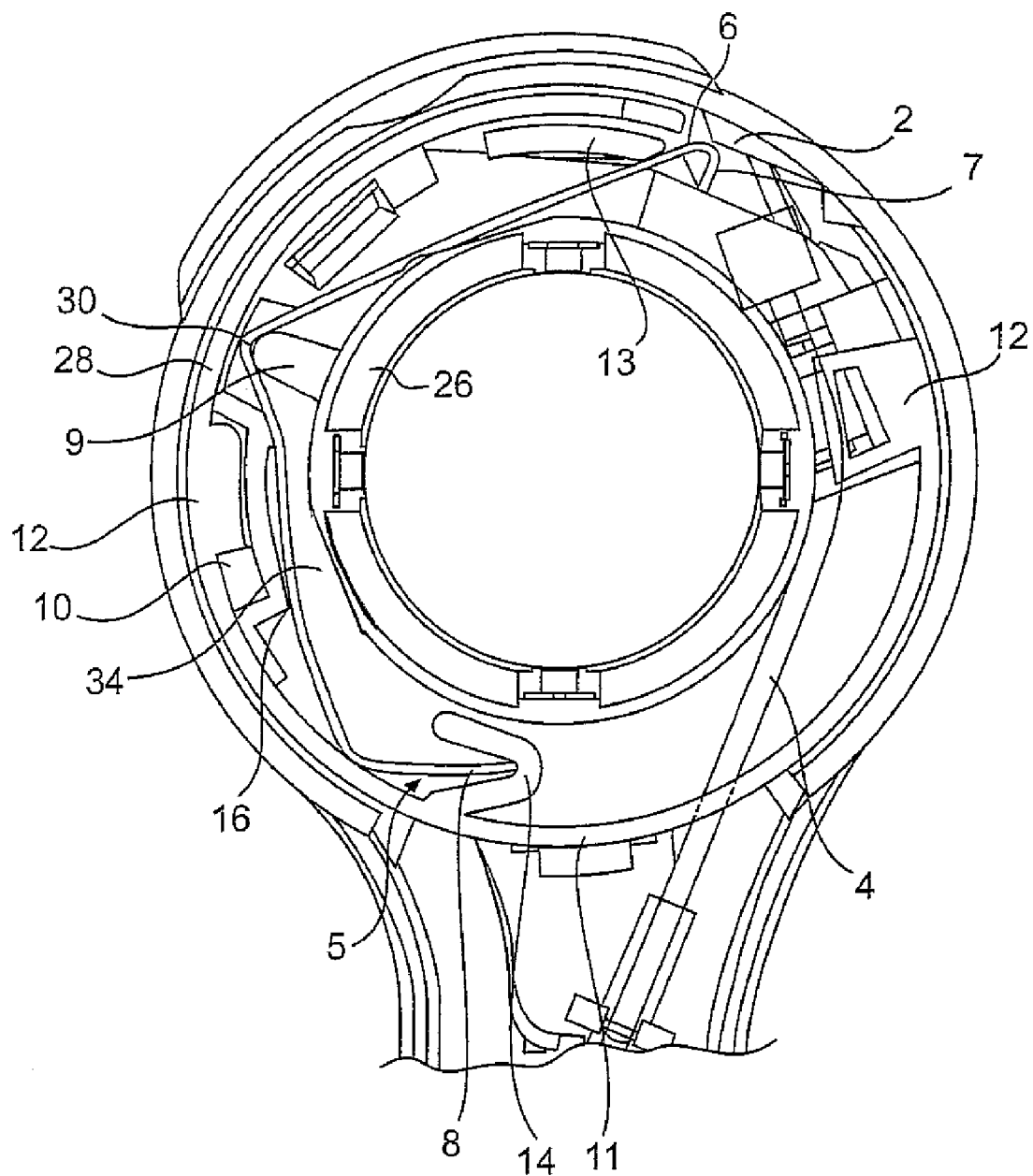
FIG. 4 is a cross-sectional view of the bicycle shifter of FIG. 1 showing the spring element preloaded and deformed.

Looking to FIG. 4, the shifter 20 is shown during a cable-release operation. When the actuator 11 is initially rotated in the cable-release direction, the spring element 5 is reversibly deformed radially outward until the spring element 5 contacts a bumper or a surface 16 on the cable spool 3, preloading the spring element 5. The base 8 is prevented from moving by the spring seat 14. The characteristics curve of the spring element 5 and the shifting forces in the release direction are influenced by the position of the contact surface 16. As the actuator 11 continues to rotate, the release element 13 engages the detent pawl 6 to release the pawl nose 7 from the current detent position, causing the pawl nose 7 to ratchet over the detent contour 2 to the next detent position. The subsequent rotational movement of the cable spool 3 is caused by the spring element returning to its original shape and the preloaded control cable 4 and occurs independently of any further displacement of the actuator 11. With this configuration, more than one gear may be shifted in the cable-release direction.

While this invention has been described by reference to a certain embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A shifter for a bicycle transmission comprising:
    a housing including a detent contour, the housing fixedly mountable to a bicycle frame member;
    a cable spool rotated relative to the housing for winding and unwinding a control cable thereon;
    an actuator displaced relative to the cable spool and including a spring detent pawl release element, a spring seat and a first spool driver operatively engaging and rotating the spool; and
    a single-piece spring element discrete from the cable spool including:
        a detent pawl engageable with the detent contour to maintain the shifter in a current detent position;
        a base supported by the spring seat; and
        a second spool driver operatively engaging and rotating the spool,
    the shifter configured such that during the onset of a cable-release operation the actuator is initially displaced from a rest position relative to the cable spool to preload and reversibly deform the spring element to assist the unwinding rotation of the cable spool without releasing the detent pawl from the current detent position.

2. A shifter according to claim 1, wherein upon further displacement of the actuator the release element engages the spring element to release the detent pawl from the current detent position.

3. A shifter according to claim 2, wherein the released preloaded spring element rotates the cable spool to unwind the control cable until engagement of the detent pawl in a next detent position.

4. A shifter according to claim 3, wherein the spring element is shaped from a flat strip of metal.

5. A shifter according to claim 4, wherein the spring element is configured such that when installed in the shifter there is no play between the spool, actuator and detent contour in the shifter rest position.

6. A shifter according to claim 5, wherein the spring element is configured to include an initial preload when installed in the shifter such that there is no play between the spool, actuator and detent contour in the shifter rest position.

7. A shifter according to claim 1, wherein the spring element is shaped from a flat strip of metal.

8. A shifter according to claim 1, wherein the spring element is configured such that when installed in the shifter there is no play between the spool, actuator and detent contour in a rest position of the shifter.

9. A shifter according to claim 8, wherein the spring element is configured to include an initial preload installed in the shifter such that there is no play between the spool, actuator and detent contour in the shifter rest position.

10. A shifter according to claim 1, wherein the cable spool includes a first bumper to support the spring element upon installation of the spring element into the cable spool.

11. A shifter according to claim 10, wherein the cable spool includes a second bumper to support the spring element under deformation.

12. A shifter according to claim 1, wherein the release element and the first spool driver are disposed on a face of the actuator, the first spool driver received in a mating slot on the cable spool.

13. A shifter according to claim 1, wherein the actuator is a rotatable handgrip.

14. A shifter according to claim 13, wherein the rotatable handgrip is rotatable about a central axis of a handlebar.

* * * * *